(12) United States Patent
Stockli

(10) Patent No.: US 8,797,516 B2
(45) Date of Patent: Aug. 5, 2014

(54) METHOD FOR SEPARATING WORN BANK NOTES FROM A QUANTITY OF BANK NOTES IN BANK NOTE PROCESSING MACHINES

(75) Inventor: Armin Stockli, Ittigen (CH)

(73) Assignee: Beb Industrie-Elektronik AG (CH)

( * ) Notice: Subject to any disclaimer, the term of this patent is extended or adjusted under 35 U.S.C. 154(b) by 278 days.

(21) Appl. No.: 13/375,416

(22) PCT Filed: May 28, 2010

(86) PCT No.: PCT/EP2010/003252
§ 371 (c)(1),
(2), (4) Date: Nov. 30, 2011

(87) PCT Pub. No.: WO2010/142386
PCT Pub. Date: Dec. 16, 2010

(65) Prior Publication Data
US 2012/0070061 A1 Mar. 22, 2012

(30) Foreign Application Priority Data

Jun. 9, 2009 (DE) .......................... 10 2009 024 872

(51) Int. Cl.
*G06K 9/74* (2006.01)
*G06K 9/00* (2006.01)
*G07D 7/00* (2006.01)

(52) U.S. Cl.
CPC .............. *G06K 9/00046* (2013.01); *G07D 7/00* (2013.01)
USPC .......................................................... 356/71

(58) Field of Classification Search
CPC .................................................. G06K 9/00046
USPC .......................................................... 356/71
See application file for complete search history.

(56) References Cited

U.S. PATENT DOCUMENTS 3,876,872 A 4/1975 Spitz
3,878,982 A 4/1975 Hoffman
(Continued)

FOREIGN PATENT DOCUMENTS

CH 640433 A5 1/1984
DE 2249860 A1 5/1973
(Continued)

OTHER PUBLICATIONS

International Search Report for PCT/EP2010/003252 (in English) mailed Sep. 29, 2010; ISA/EP.

(Continued)

*Primary Examiner* — Michael P Stafira
(74) *Attorney, Agent, or Firm* — Harness, Dickey & Pierce, P.L.C.

(57) ABSTRACT

A method is proposed for separating worn bank notes from a quantity of bank notes in bank note processing machines. A target rate $c_{unfit,0}$ of bank notes to be separated is prescribed. The bank notes are assessed one after the other. In the process they are counted. Further, the value of at least one physical parameter of each bank note affected by wear is measured during the assessment. The measured value, or a value derived therefrom, of each bank note is compared with a threshold value during the assessment. If the threshold value is exceeded, the bank note in question is separated during the assessment. The separated bank notes are counted during the assessment. The threshold value is adapted after assessing each bank note or after a fixed prescribed number m>>n of bank notes by feedback control. The control parameter is the rate $c_{unfit,i}$ of the bank notes separated up to said bank note, and the set parameter is the threshold value.

20 Claims, 1 Drawing Sheet

(56) References Cited

U.S. PATENT DOCUMENTS

2005/0239207 A1 10/2005 Gelbart
2008/0289929 A1* 11/2008 Wilfer .......................... 194/302

FOREIGN PATENT DOCUMENTS

| DE | 2454304 | A1 | 5/1975 |
|----|---------|----|----|
| EP | 0155126 | A2 | 9/1985 |
| EP | 0779604 | A1 | 6/1997 |
| EP | 1324279 | A1 | 7/2003 |
| EP | 1542173 | A1 | 6/2005 |
| WO | WO-8001963 | A1 | 9/1980 |
| WO | WO-2005124701 | A1 | 12/2005 |

OTHER PUBLICATIONS

German Search Report for 10 2009 024 872.2 (in German) dated Jul. 30, 2009.
International Preliminary Report on Patentability for PCT/EP2010-003252, Dec. 22, 2011 with English Translation (12 pages).

* cited by examiner

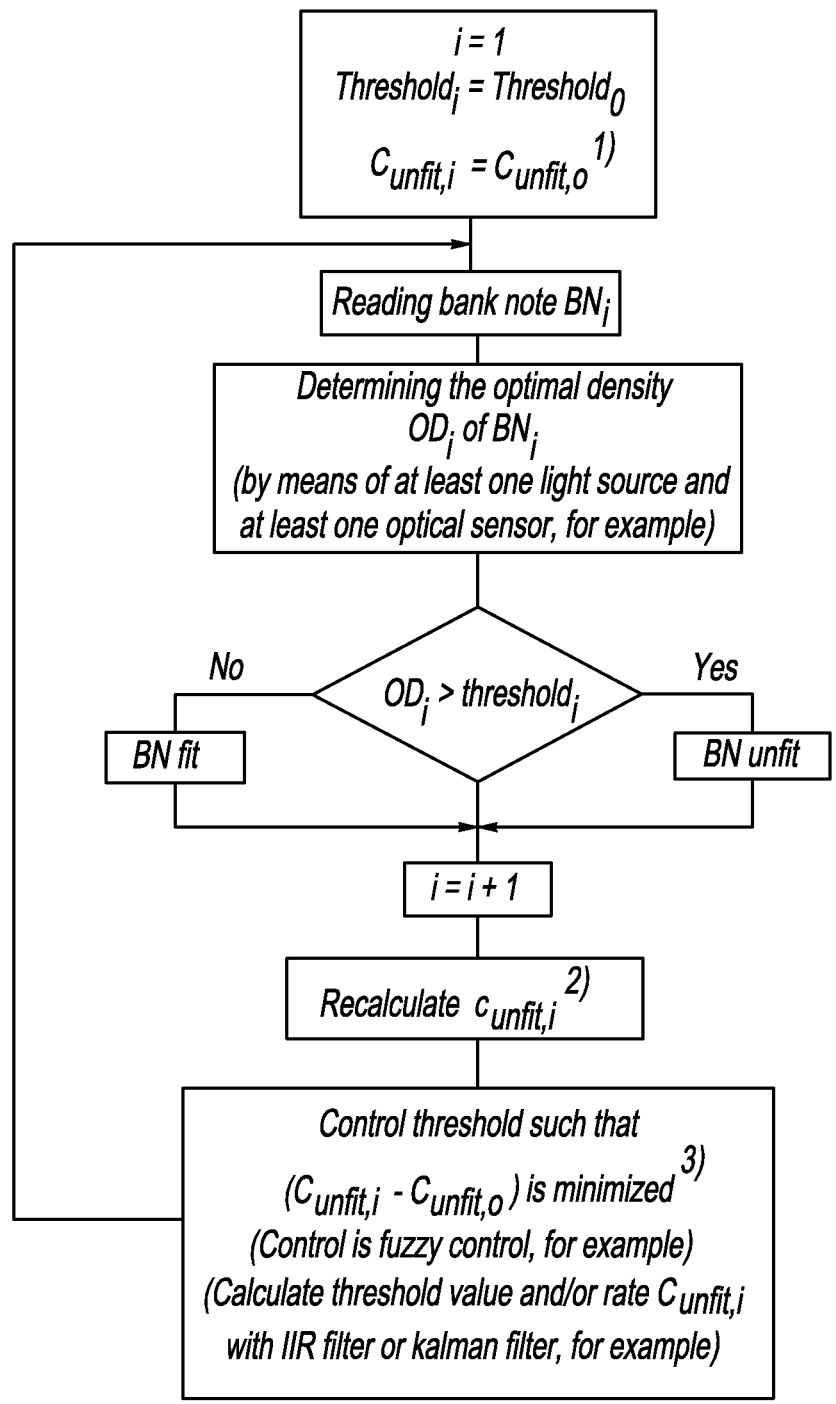

METHOD FOR SEPARATING WORN BANK NOTES FROM A QUANTITY OF BANK NOTES IN BANK NOTE PROCESSING MACHINES

CROSS-REFERENCE TO RELATED APPLICATIONS

This application is a National Stage of International Application No. PCT/EP2010/003252, filed May 28, 2010 and published in German as WO/2010/142386 on Dec. 16, 2010. This application claims the benefit and priority of German Application 10 2009 024 872.2, filed Jun. 9, 2009. The entire disclosures of the above applications are incorporated herein by reference.

BACKGROUND

This section provides background information related to the present disclosure which is not necessarily prior art.

1. Technical Field

The invention relates to a method for separating worn bank notes from a quantity n of bank notes in bank note processing machines.

2. Discussion

Worn bank notes are automatically removed from circulation in bank note processing machines, such as devices for inspecting, counting and packing bank notes, and automated teller machines for the deposit and/or payment of bank notes to bank customers. Wear is present, for example, with soiling or ageing of the bank note. Wear and tear of a bank note further exists if the bank note is grubby, limp or torn, or if the bank note has a large number of folded edges. Bank note processing machines are equipped with sensors to detect the worn bank notes during processing. These sensors measure the value of one or more physical parameters of the bank notes that provide information about the condition of the bank notes. One such physical parameter is optical density, for example. A threshold or threshold value is specified for the measured value of physical size. If this threshold value is reached or exceeded in a bank note, this bank note is separated. If the bank note falls below this threshold value, the bank note remains in circulation. The proportion of bank notes separated from a quantity of bank notes depends on the threshold value and the sensors.

The threshold value can be specified by an operator or manufacturer of a bank note processing machine. Since the proportion of separated bank notes is very sensitive to the level of the threshold value, a threshold value set marginally too high can result in bank notes remaining in circulation that are no longer suitable because of wear. The proportion or rate of separated bank notes is too small in this case. If the threshold value is set too low on the other hand, bank notes are separated that are still suitable for circulation. In this case the proportion or rate of separated bank notes is too high. Since even a minor change in the threshold value sensibly affects the rate of separated bank notes, and the effect of the change can be detected only after a large number of bank notes have been inspected, an adjustment to the threshold value by the manufacturer or operator is made more difficult and leads to poor results.

Determining a threshold value from at least two more bank notes selected by a user at least one of which is clearly used in his opinion and at least one additional one which is clearly suitable for circulation in his view can result in a too large or too small rate of separated bank notes. With this method the rate is decisively dependent on the condition of the selected bank notes.

SUMMARY OF THE INVENTION

An object of the present invention is to provide a method for separating used bank notes from a quantity n of banknotes in which an automatic adjustment of the threshold value takes place for a physical property of the bank notes characterizing the state of wear.

The method provides for a target rate $c_{unfit,0}$ of bank notes for separation to be prescribed at the start of an assessment of a number n of bank notes in bank note processing machines. The bank notes are assessed one after another. The bank notes are counted as they are assessed. In addition, the value of at least one physical parameter of each bank note affected by wear is determined by measurement during the assessment. The measured value, or a value derived therefrom, is compared with a threshold value during the assessment. If the measured value is above the threshold value, the bank note in question is separated. If the measured value is below the threshold value, it remains in circulation. If the measured value or the value derived from it matches the threshold value, the bank note can either be separated or continue to be used. This can be determined. The separated bank notes are counted during the assessment. The threshold value for the first bank note to be assessed is specified. After each banknote or after a firmly prescribed number m of bank notes, the threshold value is adapted by feedback control. m is a natural, positive number, exactly like n. m is very small compared with n. Typically, m is <10. The control parameter for control corresponds to the rate $c_{unfit,i}$ of the bank notes separated prior to said bank note. The set parameter corresponds to the threshold value. The threshold value is advantageously adapted in such a way that the sum of the difference of $c_{unfit,i}$ and $c_{unfit,0}$ is minimized.

In this method, advantage is taken of the fact that the rate $c_{unfit,i}$, following an initial or transitional reaction, converges towards the specified rate $c_{unfit,0}$ and the system adjusts to the target rate $c_{unfit,0}$. The adjustment to the target rate also happens when a certain number of bank notes in succession are assessed in very good or very poor condition. It is only important that the number n is large enough to let the transitional reaction subside.

The method and the adjustment of the target rate after the transitional reaction is independent of a specified target rate and of an adjustment of the threshold value by an operator or manufacturer. Convergence also sets in when the threshold value specified at the commencement of the method is unsuitable.

Since a threshold value and a target rate are specified at the beginning of the method, this ensures that bank notes are separated in each instance. This also happens when all the bank notes are new and thus show no wear. However, this is not critical since the only guarantee has to be that worn bank notes are removed from circulation based on regulations.

A further advantage of the method in accordance with the invention consists in the fact that no great requirements regarding measuring accuracy and sensitivity are placed on the sensor for assessing the measurement parameter. So a cost-effective sensor can be used that possesses a certain robustness. Since the measurement does not need to be highly accurate, the duration of the measurement can be shortened and the progression of the assessment can be speeded up.

In accordance with an advantageous embodiment of the invention, the value of the optical density is determined in at least one section of the bank note as a physical property. The optical density gives an indication of the degree of soiling of a bank note. With new bank notes it is low and increases as soiling becomes more severe. The optical density of a bank note is preferably determined in an unprinted section. In this way, the optical density on bank notes with a different value of the same currency is comparable.

In accordance with a further advantageous embodiment of the invention, the optical density is determined by means of at least one light source and at least one optical sensor. Using the optical sensor, for example, the light emitted by the light source and reflected by a bank note and/or transmitted through a bank note is measured. In the first instance incident light, and in the second instance transmitted light, is assessed by the sensor.

In accordance with a further advantageous embodiment of the invention, the rate $c_{unfit,i}$ is calculated from the number of bank notes assessed up to said bank note on the one hand, and from the number of bank notes separated up to said bank note on the other. In the simplest case, the rate $c_{unfit,i}$ corresponds to the quotient from the number of bank notes separated up to said bank note on the one hand and the number i of all bank notes assessed up to said bank note.

In accordance with a further advantageous embodiment of the invention, the rate $c_{unfit,i}$ is calculated as the mean from the rates $c_{unfit,0}, c_{unfit,1}, c_{unfit,2}, c_{unfit,3}, \ldots C_{unfit,i-1}$ of the preceding bank notes. The arithmetic, geometric or harmonic mean can be calculated. In addition to the mean, the median can also be calculated, which is more robust against outliers.

In accordance with a further advantageous embodiment of the invention, the control is adaptive control. Compared with normal control, adaptive control has the advantage that it can compensate for greater changes with respect to the measured variable.

In accordance with a further advantageous embodiment of the invention, the control is fuzzy control. In fuzzy control, symbolic values are assigned to the control variable, the control error and the set value instead of numerical values. Fuzzy control is based on fuzzy logic.

In accordance with a further advantageous embodiment of the invention, the sum of the difference from the rate $c_{unfit,0}$ and the rate $c_{unfit,i}$ is minimized when calculating the threshold value.

In accordance with a further advantageous embodiment of the invention, an IIR (infinite impulse response) filter is used to calculate the threshold value and/or the rate $c_{unfit,i}$. This is a time-discrete, linear, shift-invariant filter in digital signal processing.

In accordance with a further advantageous embodiment of the invention, a Kalman filter is used to calculate the threshold value and/or the rate $c_{unfit,i}$. Conclusions about the precise status are possible with the aid of this filter in the case of erroneous measured values. Problems that occur during the measurement can be eliminated.

In accordance with a further advantageous embodiment of the invention, an interval is specified for the threshold value. This prevents the threshold value from changing too radically.

In accordance with a further advantageous embodiment of the invention, several target rates $c_{unfit,0}$ are specified. The operator can switch between the different target rates even during the assessment of the bank notes.

Further advantages and advantageous embodiments of the invention can be found in the following description, the drawing and the claims.

BRIEF DESCRIPTION OF THE DRAWINGS

An embodiment of the invention using a flow chart is shown in the drawing.

The drawing described herein is for illustrative purposes only of selected embodiments and not all possible implementations, and is not intended to limit the scope of the present disclosure.

FIG. 1 shows a flow chart of a method for separating worn bank notes.

DETAILED DESCRIPTION OF THE PREFERRED EMBODIMENTS

Example embodiments will now be described more fully with reference to the accompanying drawing.

FIG. 1 shows in a flow chart the sequence of process steps to separate worn bank notes from a totality of n bank notes. At the start, the counter i is set to 1. The threshold value threshold0 for the first bank note is specified: thresholdi with i=1 corresponds to threshold0. Further, the target rate cunfit,0 for the bank notes to be separated is specified and for i=1 the rate $c_{unfit,1} = c_{unfit,0}$ is set. Then the first bank note BN1 is assessed and the optical density OD1 of the first bank note BN1 is determined. The optical density OD1 is then compared with the threshold value threshold1. The question is asked whether OD1>threshold1. If this is positive, bank note BN1 is classified as worn or unfit. For this case, BN1_unfit=1 applies. BN1 is separated and removed from circulation. For this purpose, it is deposited in a special compartment of the bank note processing machine. If OD1>threshold1 does not hold true for BN1, BN1 remains in circulation and is not separated. In this case, BN1 is fit or BN1_fit=1 or BN1_unfit=0. Then the counter is increased by 1: i=i+1. The counter now reads i=2. The current rate $c_{unfit,2}$ for the separated bank notes is calculated from the preceding rate $c_{unfit,1}$.

$$C_{unfit,i+1} = (BN_{i\_unfit})^* w + C_{unfit,i}^*(1-w)$$

where
BNi_unfit=1 if BNi was separated and BNi_unfit=0 if BN1 was not separated. A typical value for w is at w=1/2000.

Finally, the threshold value is adapted by feedback control so that the sum of the difference from $c_{unfit,i}$ and $c_{unfit,0}$ is minimized. From this results the threshold value thresholdi with i=2 for the assessment of bank note BN2.

These process steps are performed for all bank notes BN1 to BNn. Counter i runs through all natural numbers from 1 to n.

All features of the invention can be essential to the invention, both individually and in any combination with each other.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:
1. A method for separating worn bank notes from a quantity n of bank notes in bank note processing machines comprising:
specifying a target rate $c_{unfit,0}$ for bank notes to be separated,
assessing the n bank notes one after another,
counting the n bank notes during the assessment, measuring the value of at least one physical variable of each bank note affected by wear during the assessment, comparison of the measured value, or a value derived therefrom, of each bank note with a threshold value during the assessment, separation of bank notes when the threshold value is exceeded during the assessment, counting the separated bank notes during the assessment, and adjusting the threshold value after assessing each bank note or after each firmly determined number m<<n of bank notes by feedback control, where the control variable is the rate $c_{unfit,i}$ of the bank notes separated up to said bank note and the set parameter is the threshold value.

2. The method according to claim 1 wherein the optical density is determined in at least one section of each bank note as a physical property.

3. The method according to claim 2, wherein the optical density is determined by means of at least one light source and at least one optical sensor.

4. The method according to claim 3, wherein the light emitted by the light source and reflected by a bank note and/or transmitted through a bank note is measured using the optical sensor.

5. The method according to claim 1, wherein the rate $c_{unfit,i}$ is calculated from the number of all bank notes assessed preceding said bank note on the one part and from the number of bank notes separated up to said bank note on the other part.

6. The method according to claim 1, wherein the rate $c_{unfit,i}$ is calculated as a mean from the rates of the preceding bank notes.

7. The method according to claim 1, wherein the control is an adaptive control.

8. The method according to claim 1, wherein the control is a fuzzy control.

9. The method according to claim 1, wherein, when calculating the threshold value, the sum of the difference from the rate $c_{unfit,0}$ and $c_{unfit,i}$ is minimized.

10. The method according to claim 1, wherein an IIR filter is used to calculate the threshold value and/or the rate $c_{unfit,i}$.

11. The method according to claim 1, wherein a Kalman filter is used to calculate the threshold value and/or the rate $c_{unfit,i}$.

12. The method according to claim 1, wherein an interval is specified for the threshold value.

13. The method according to claim 1, wherein several target rates $c_{unfit,0}$ are specified and wherein during assessment of the bank notes a switch is made from one target rate to another.

14. A method for separating worn bank notes from a plurality of bank notes in a bank note processing machine comprising:

specifying a target rate for separating the worn bank notes from the plurality of bank notes;

assessing each one of the plurality of bank notes individually and sequentially;

counting the plurality of bank notes during the assessing of the plurality of bank notes;

measuring, during the assessing, a value of at least one physical variable of each one of the plurality of bank notes;

comparing the measured value, or a derivative thereof, of each one of the plurality of bank notes with a threshold value during the assessment;

separating from the plurality of bank notes, worn bank notes in which the measured value thereof exceeds the threshold value;

counting the separated worn bank notes during the assessing of the plurality of bank notes; and modifying the threshold value each time one of the plurality of bank notes is assessed, or after a subgroup of the plurality of bank notes is assessed, by feedback control;

wherein a control variable of the feedback control is a rate of previously separated worn bank notes from the plurality of bank notes.

15. The method of claim 14, wherein measuring the value of at least one physical variable of each one of the plurality of bank notes includes measuring optical density.

16. The method of claim 15, further comprising measuring the optical density with at least one light source and at least one optical sensor.

17. The method of claim 16, further comprising measuring with the optical sensor light emitted by the light source and reflected by, and/or transmitted through, a bank note of the plurality of bank notes being measured.

18. The method of claim 14, wherein the rate is calculated based on both a number of worn bank notes previously separated from the plurality of bank notes, and a total number of the plurality of bank notes previously assessed.

19. The method of claim 14, further comprising calculating at least one of the threshold value and the rate with an IIR filter.

20. The method of claim 14, further comprising calculating at least one of the threshold value and the rate with a Kalman filter.

* * * * *